US011884519B2

(12) United States Patent
Satou

(10) Patent No.: US 11,884,519 B2
(45) Date of Patent: Jan. 30, 2024

(54) CRANE

(71) Applicant: SUMITOMO HEAVY INDUSTRIES CONSTRUCTION CRANES CO., LTD., Tokyo (JP)

(72) Inventor: Tetsuro Satou, Aichi (JP)

(73) Assignee: SUMITOMO HEAVY INDUSTRIES CONSTRUCTION CRANES CO., LTD., Tokyo (JP)

( * ) Notice: Subject to any disclaimer, the term of this patent is extended or adjusted under 35 U.S.C. 154(b) by 0 days.

(21) Appl. No.: 17/696,078

(22) Filed: Mar. 16, 2022

(65) Prior Publication Data

US 2022/0297986 A1 Sep. 22, 2022

(30) Foreign Application Priority Data

Mar. 17, 2021 (JP) ................................ 2021-043651

(51) Int. Cl.

*B66C 13/46* (2006.01)
*B66C 23/90* (2006.01)
*B66C 23/36* (2006.01)

(52) U.S. Cl.

CPC ............ *B66C 13/46* (2013.01); *B66C 23/905* (2013.01); *B66C 23/36* (2013.01); *B66C 2700/0371* (2013.01)

(58) Field of Classification Search

CPC ....... B66C 13/46; B66C 13/22; B66C 13/063; B66C 23/905

See application file for complete search history.

(56) References Cited

U.S. PATENT DOCUMENTS

2014/0278076 A1* 9/2014 Conquest ................ B66C 13/46 701/468
2016/0119589 A1* 4/2016 Tanizumi ............. H04N 23/635 345/173
2020/0247647 A1 8/2020 Kanda et al.
2022/0098008 A1 3/2022 Minami et al.
2022/0332550 A1* 10/2022 Minami .................. B66C 13/46

FOREIGN PATENT DOCUMENTS

EP 3 693 322 A1 8/2020
JP 2020-169087 A 10/2020
WO 2020-166721 A1 8/2020

OTHER PUBLICATIONS

JP 2020/169087A Machine Translation (Year: 2020).*
Search Report issued in European Application No. 22159058.1, dated Aug. 19, 2022.

* cited by examiner

*Primary Examiner* — Michael R Mansen
*Assistant Examiner* — Juan J Campos, Jr.
(74) *Attorney, Agent, or Firm* — Michael Best & Friedrich LLP

(57) ABSTRACT

Provided is a crane including a boom. The crane hoists a suspended load through a hook from a tip of the boom, and position adjustment control for causing a position of the hook and a position of the tip of the boom to be close to each other as viewed in a vertical direction is performed until the suspended load is separated from a ground surface from a start of a hoisting motion.

11 Claims, 9 Drawing Sheets

CRANE

RELATED APPLICATIONS

The content of Japanese Patent Application No. 2021-043651, on the basis of which priority benefits are claimed in an accompanying application data sheet, is in its entirety incorporated herein by reference.

BACKGROUND

Technical Field

Certain embodiments of the present invention relate to a crane.

Description of Related Art

The related art proposes a method including attaching a global navigation satellite system (GNSS) receiver to each of a boom tip portion and a hook and adjusting the position of the boom tip portion before the start of hoisting so that the position of the boom tip portion viewed from above and the position of the hook viewed from above coincide with each other.

SUMMARY

According to an embodiment of the present invention, there is provided a crane including a boom. The crane hoists a suspended load through a hook from a tip of the boom, and position adjustment control for causing a position of the hook and a position of the tip of the boom to be close to each other as viewed in a vertical direction is performed until the suspended load is separated from a ground surface from a start of a hoisting motion.

DETAILED DESCRIPTION

Since the posture of a suspended load is changed from the start of hoisting in a case where a hook is not positioned immediately above the center of gravity of the suspended load at the time of the start of the hoisting of the suspended load, a positional shift between the boom tip portion and the hook may occur in a crane.

However, the crane in the related art could not cope with a positional shift between the boom tip portion and the hook occurring after the start of the hoisting of the suspended load.

It is desirable to effectively cope with a positional shift between a boom tip portion and a hook occurring after the start of the hoisting of a suspended load.

According to the present invention, it is possible to effectively cope with a positional shift between the tip of a boom and a hook occurring after the start of the hoisting of a suspended load.

Schematic Configuration of Crane

Figure 1:
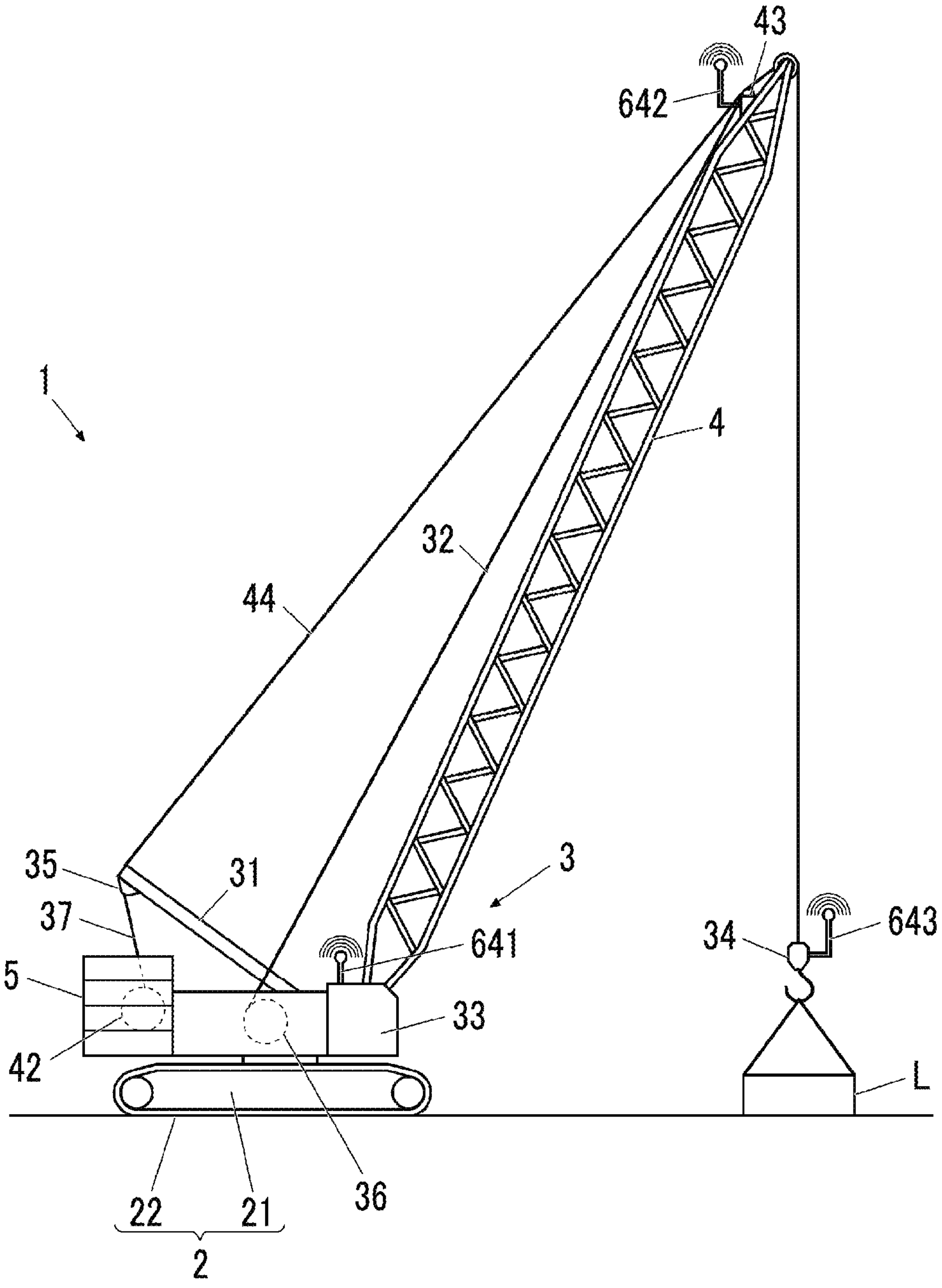
FIG. 1 is a side view of a crane according to an embodiment of the present invention.
Figure 2:
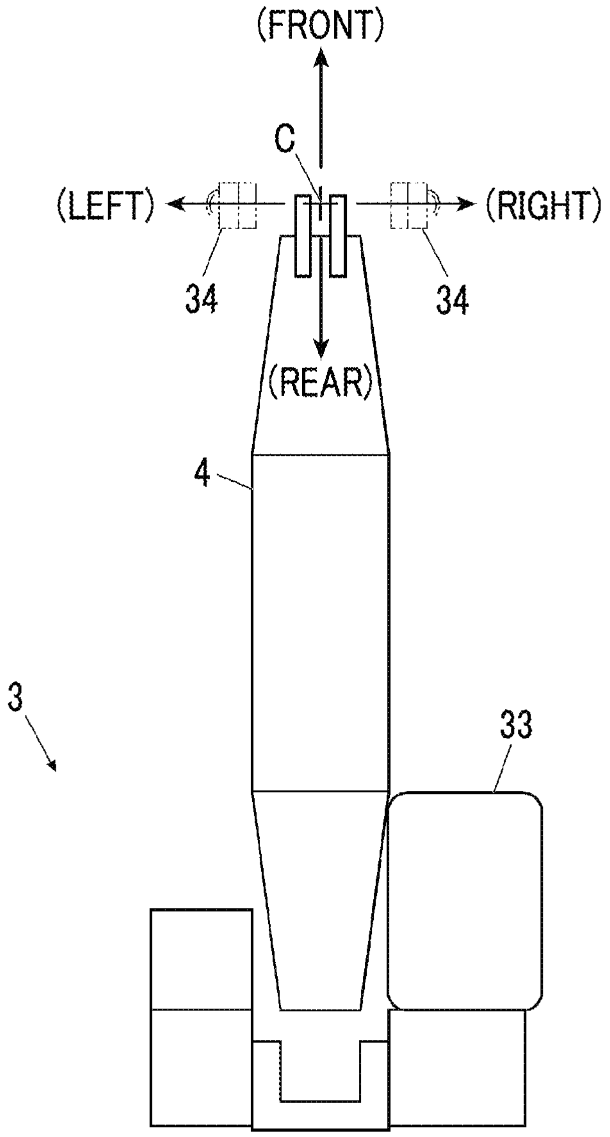
FIG. 2 is a schematic plan view of a rotating platform of the crane.

FIG. 1 is a side view of a crane 1 and FIG. 2 is a schematic plan view of a rotating platform 3 of the crane 1. The crane 1 is a so-called mobile crawler crane. With regard to the description of the crane 1, as shown in FIG. 2, a front-rear direction and a left-right direction viewed from an occupant of the rotating platform 3 as a crane body will be described as a front-rear direction and a left-right direction of the crane 1. Unless otherwise specified, in principle, the direction of each part of a lower traveling body 2 will be described assuming that the lower traveling body 2 is in a state where the front-rear direction of the lower traveling body 2 coincides with the front-rear direction of the rotating platform 3 (referred to as a reference posture).

Further, in the following description, the state of the crane 1 viewed in a direction perpendicular to a horizontal plane on which the crane 1 is positioned, that is, a vertical direction will be described in a case where "in a plan view" is mentioned on the premise that the crane 1 is positioned on the horizontal plane.

As shown in FIG. 1, the crane 1 includes the self-propelled crawler type lower traveling body 2, the rotating platform 3 that is turnably mounted on the lower traveling body 2, and a boom 4 that is attached to the front side of the rotating platform 3 so as to be capable of performing a derricking motion.

The lower traveling body 2 includes a main body 21 and crawlers 22 that are provided on both left and right sides of the main body 21. The left and right crawlers 22 are rotationally driven by traveling hydraulic motors (not shown), respectively.

The boom 4 is attached to the front side of the rotating platform 3 so as to be capable of performing a derricking motion. A sheave 43, which guides a hoisting rope 32, is rotatably attached to near an upper tip of the boom 4.

Further, the lower end portion of a mast 31 is supported on the rear side of the boom 4 by the rotating platform 3.

Furthermore, the rotating platform 3 is driven to turn about an axis parallel to a vertical direction with respect to the lower traveling body 2 by a turning hydraulic motor (not shown).

Counterweights 5, which make a weight balance with the boom 4 and a suspended load L, are attached to a rear portion of the rotating platform 3. The number of counterweights 5 can be increased and decreased as necessary.

A derricking winch 42, which performs a derricking motion of the boom 4, is provided near the counterweight 5 and a hoisting winch 36, which winds and unwinds the hoisting rope 32, is provided on the front side of the derricking winch 42. The hoisting winch 36 winds and unwinds the hoisting rope 32 by a hoisting hydraulic motor (not shown) to hoist and lower a hook 34 and the suspended load.

Further, a cab 33 is disposed on the front right side of the rotating platform 3.

The mast 31 includes an upper spreader 35 at the upper end portion thereof, and the upper spreader 35 is connected to one end portion of a pendant rope 44 of which the other end portion is connected to the upper end portion of the boom 4. A lower spreader (not shown) is provided below the upper spreader 35. In a case where a derricking rope 37 wound several times between the upper spreader 35 and the lower spreader is wound or unwound by the derricking winch 42, a distance between the upper spreader 35 and the lower spreader is changed, so that the derricking motion of the boom 4 is performed. The derricking winch 42 is driven by a derricking hydraulic motor (not shown).

Control System of Crane

Figure 3:
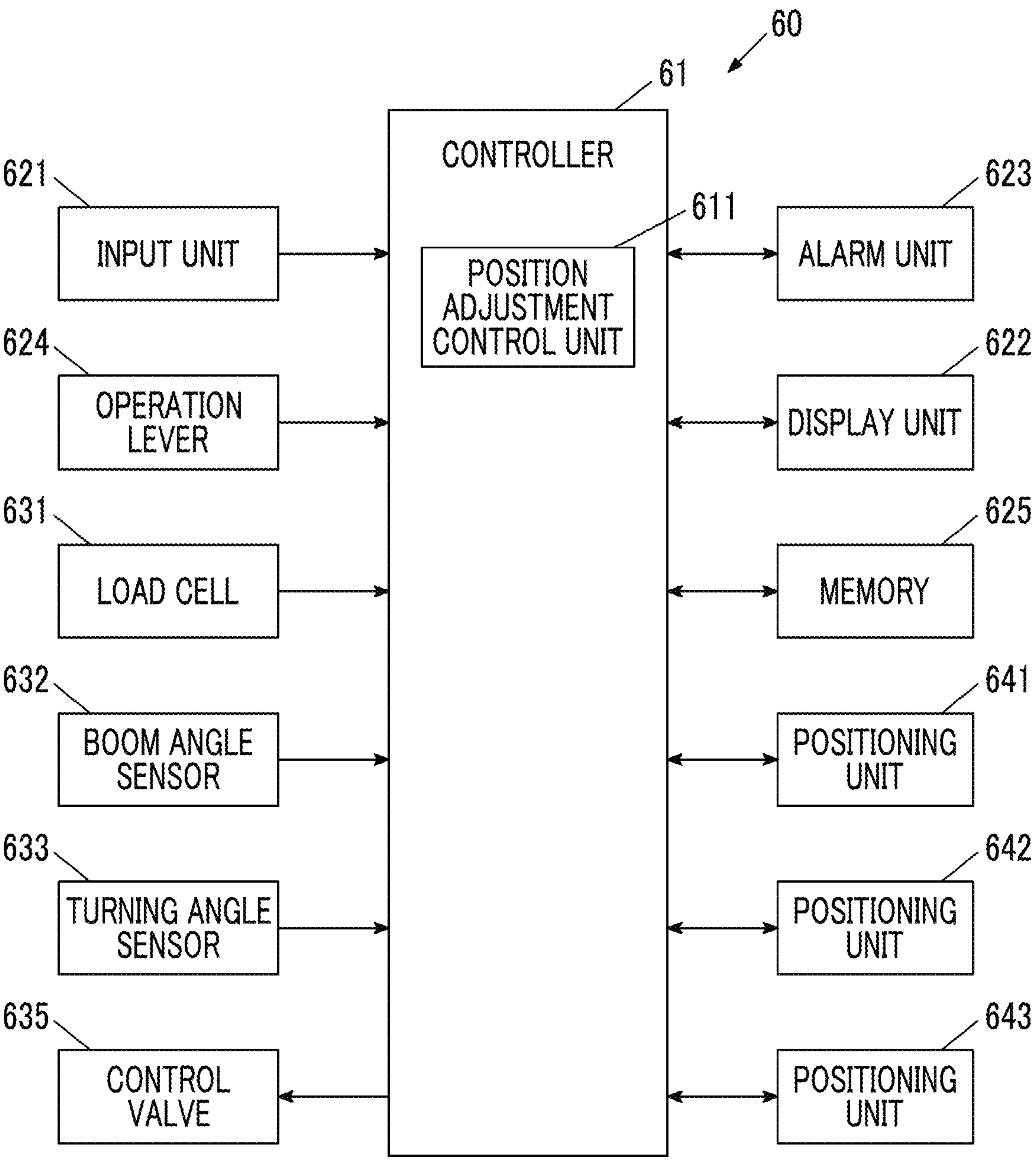
FIG. 3 is a block diagram showing a control device for the crane and a peripheral configuration thereof.

The cab 33 of the rotating platform 3 is provided with a control device 60 for the crane. FIG. 3 is a block diagram showing the control device 60 for the crane and a peripheral configuration thereof. The control device 60 is a control terminal mounted on the crane 1, and mainly controls various motions, such as the traveling and turning of the crane 1 and the hoisting and lowering of the suspended load.

The control device 60 includes a controller 61 that includes a calculation processing device including a CPU, a ROM and a RAM serving as storage devices, other peripheral circuits, and the like.

The controller 61 includes a software module of a position adjustment control unit 611 that performs the position adjustment control of the tip of the boom 4 and the hook 34 to be described later. The position adjustment control unit 611 may be formed of hardware.

An input unit 621, a display unit 622, an alarm unit 623, an operation lever 624, and a memory 625 are connected to the controller 61, and these form the control device 60.

In addition, a load cell 631, a boom angle sensor 632, a turning angle sensor 633, a control valve 635, and positioning units 641 to 643 are connected to the controller 61.

The input unit 621 is, for example, an input interface, such as a touch panel, and outputs a control signal, which corresponds to an operation input from a worker, to the controller 61. The worker can operate the input unit 621 to perform the settings of the length of the boom 4 and the weight of the suspended load, various other settings, and various inputs necessary for control.

Figure 9:
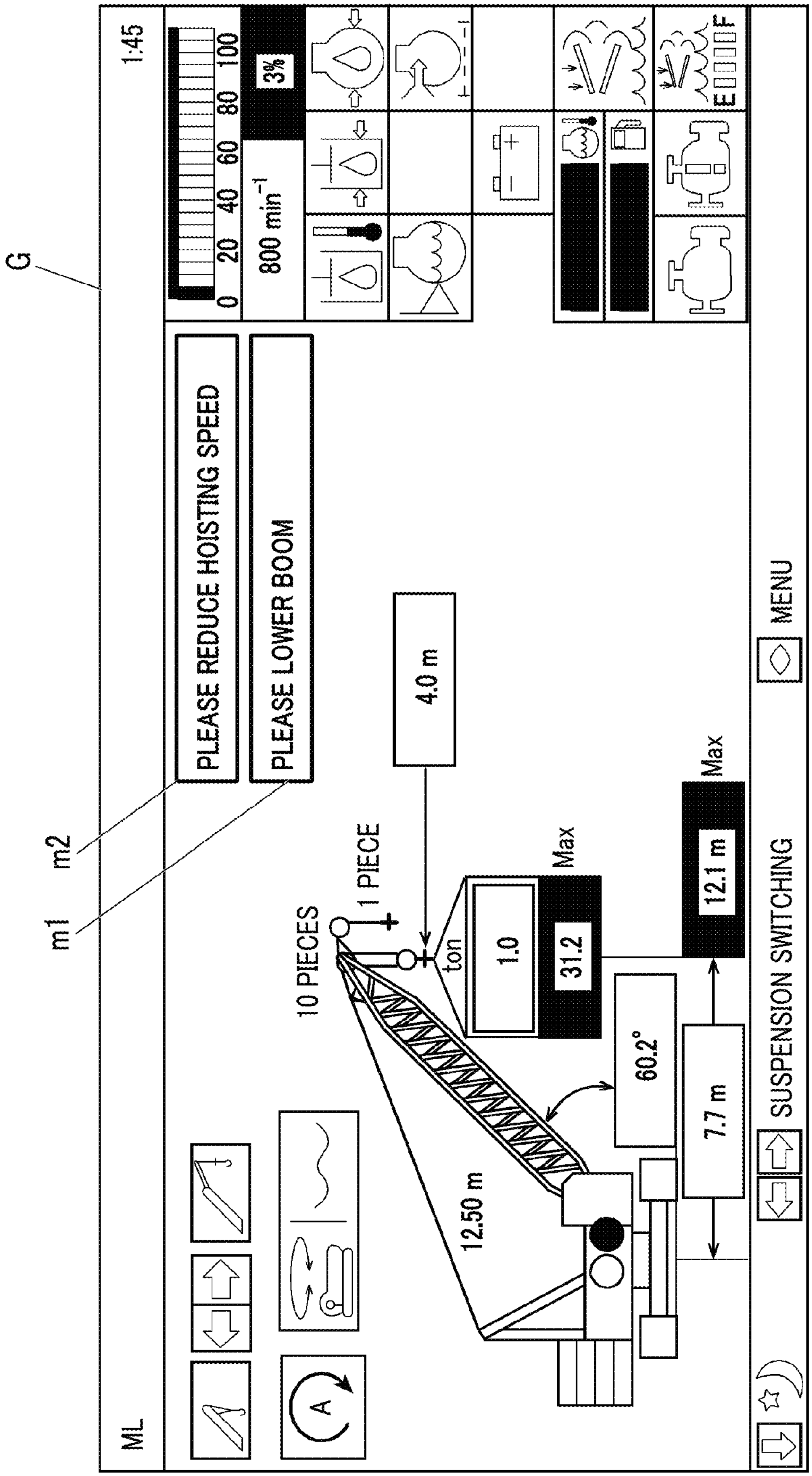
FIG. 9 is a display example that displays an instruction to instruct a worker to operate on a state display screen for the crane displayed on a display unit.

The display unit 622 includes, for example, a touch panel type display also used as the input unit 621, and displays information, such as the weight of the suspended load, a boom angle, and the turning angle of the rotating platform 3, on a display screen on the basis of a control signal output from the controller 61 (see FIG. 9).

The alarm unit 623 generates an alarm on the basis of a control signal output from the controller 61.

The operation lever 624 is, for example, used to manually input operations for causing the crane 1 to perform various motions and to input a control signal corresponding to a manipulated variable of the operation lever 624 to the controller 61.

For example, the operation lever 624 can be used to input the traveling motion of the lower traveling body 2, the turning motion of the rotating platform 3, the derricking motion of the boom 4, and the raising/lowering motion of the suspended load.

The load cell 631 is attached to the upper spreader 35, measures tension acting on the pendant rope 44 causing the boom 4 to perform a derricking motion, and outputs a control signal corresponding to the measured tension to the controller 61.

The boom angle sensor 632 is attached to the base end side of the boom 4, measures the derricking angle of the boom 4 (hereinafter, also referred to as a boom angle), and outputs a control signal corresponding to the measured boom angle to the controller 61. The boom angle sensor 632 measures, for example, a ground angle, which is an angle with respect to the horizontal plane, as the boom angle.

The turning angle sensor 633 is attached between the lower traveling body 2 and the rotating platform 3, measures the turning angle of the rotating platform 3, and outputs a control signal corresponding to the measured turning angle to the controller 61. The turning angle sensor 633 measures, for example, an angle around a vertical axis as the turning angle.

The control valve 635 is formed of a plurality of valves that can be switched according to a control signal output from the controller 61.

For example, the control valve 635 includes valves that control the rotational drive of the left and right crawlers 22 of the lower traveling body 2, a valve that controls the turning motion of the rotating platform 3, a valve that controls the rotational drive of the derricking winch, a valve that controls the rotational drive of the hoisting winch, and the like.

The positioning unit 641 is provided on the cab 33 of the rotating platform 3, the positioning unit 642 is provided near the tip of the boom 4, and the positioning unit 643 is provided on the hook 34. Each of these positioning units is formed of a GNSS receiver that detects the position thereof. The positioning unit 641 is not limited to the cab 33, and may be provided at any position on the rotating platform 3.

Each of the positioning units 641 to 643 measures the current position (the latitude, the longitude, and the altitude) of the attachment position thereof, and periodically outputs positioning data, which represent the current position and the like, to the controller 61.

In the following description, "the tip of the boom 4" indicates a position from which the hoisting rope 32 suspended toward the hook 34 from the boom 4 starts to be suspended (reference character C in FIG. 2).

The positioning unit 642 attached near the tip of the boom 4 and "the tip of the boom 4" are away from each other to some extent in a plan view (a position projected onto the horizontal plane) and the positions thereof do not exactly coincide with each other.

On the other hand, a relative positional relationship between the positions of the positioning units 641 and 642 and "the tip of the boom 4" is already known. For this reason, the controller 61 calculates the position of "the tip of the boom 4" in a plan view from the positions of the positioning units 641 and 642 and the derricking angle of the boom 4 in a plan view as necessary.

In the following description, the position of "the tip of the boom 4" in a plan view is simply referred to as "boom tip position" and the position of "hook 34" in a plan view is simply referred to as "hook position".

"Hook position" may be the attachment position of the positioning unit 643 on the hook 34, or may be the centroid position of the hook 34. In a case where the hook position and the attachment position of the positioning unit 643 do not coincide with each other, it is preferable that the control device 60 stores the relative positional relationship thereof as setting data.

Position Adjustment Control

The position adjustment control performed by the position adjustment control unit 611 will be described in detail with reference to FIGS. 1 to 8.

Figure 4:
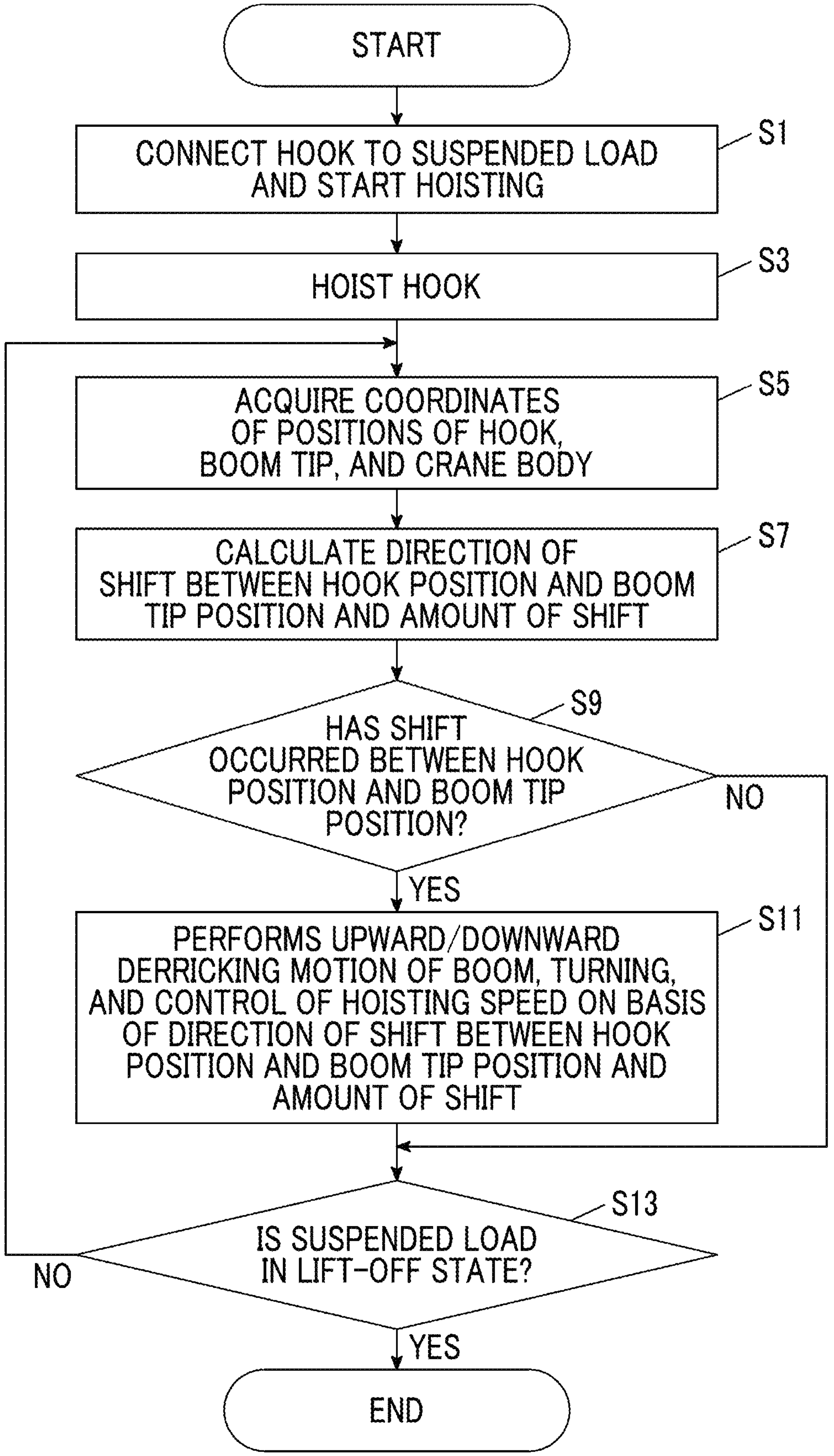
FIG. 4 is a flowchart of position adjustment control.
Figure 5:
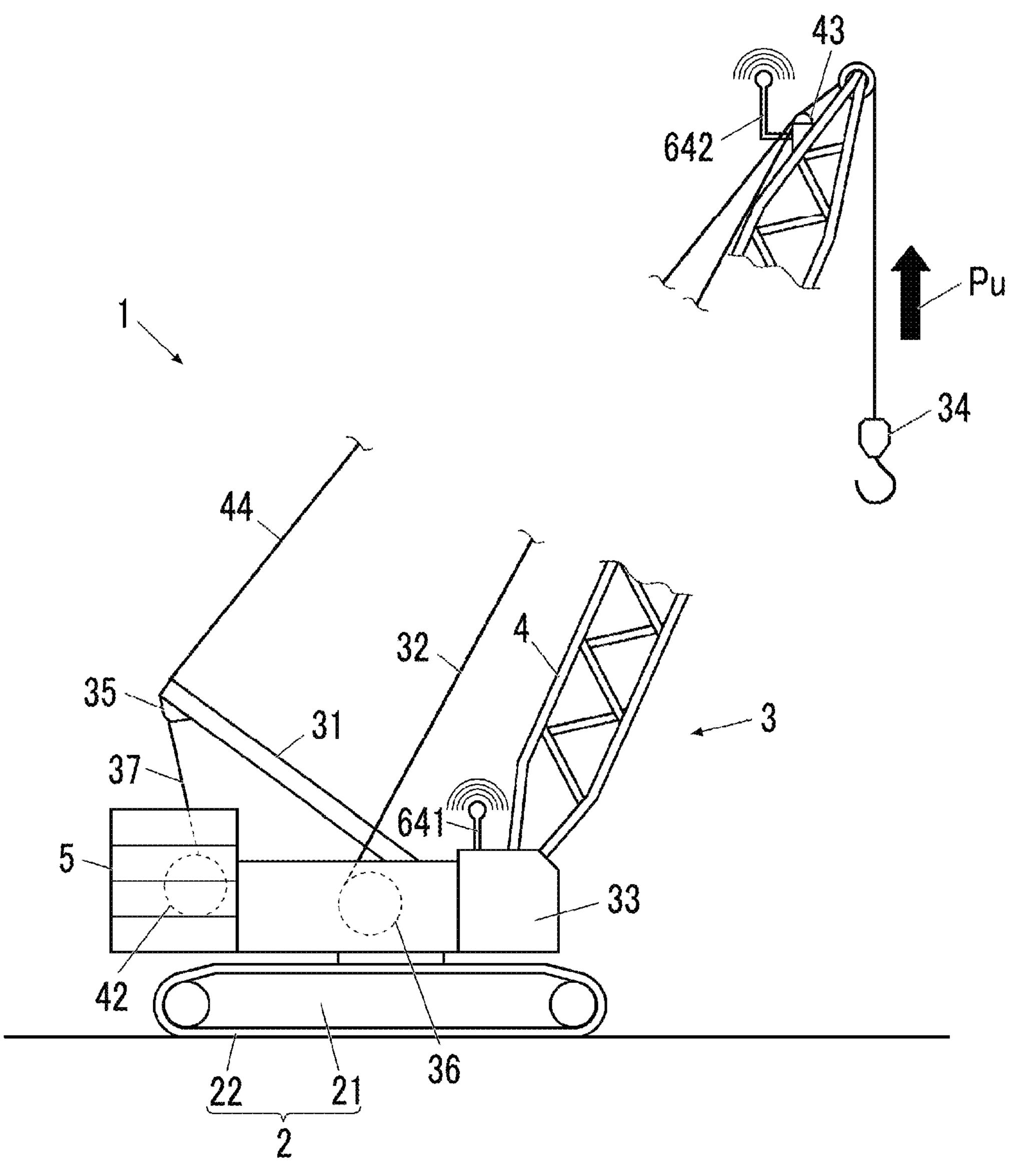
FIG. 5 is a diagram illustrating a state where the position of a hook relative to the position of a boom in a plan view is not changed in the hoisting motion of a suspended load.
Figure 6:
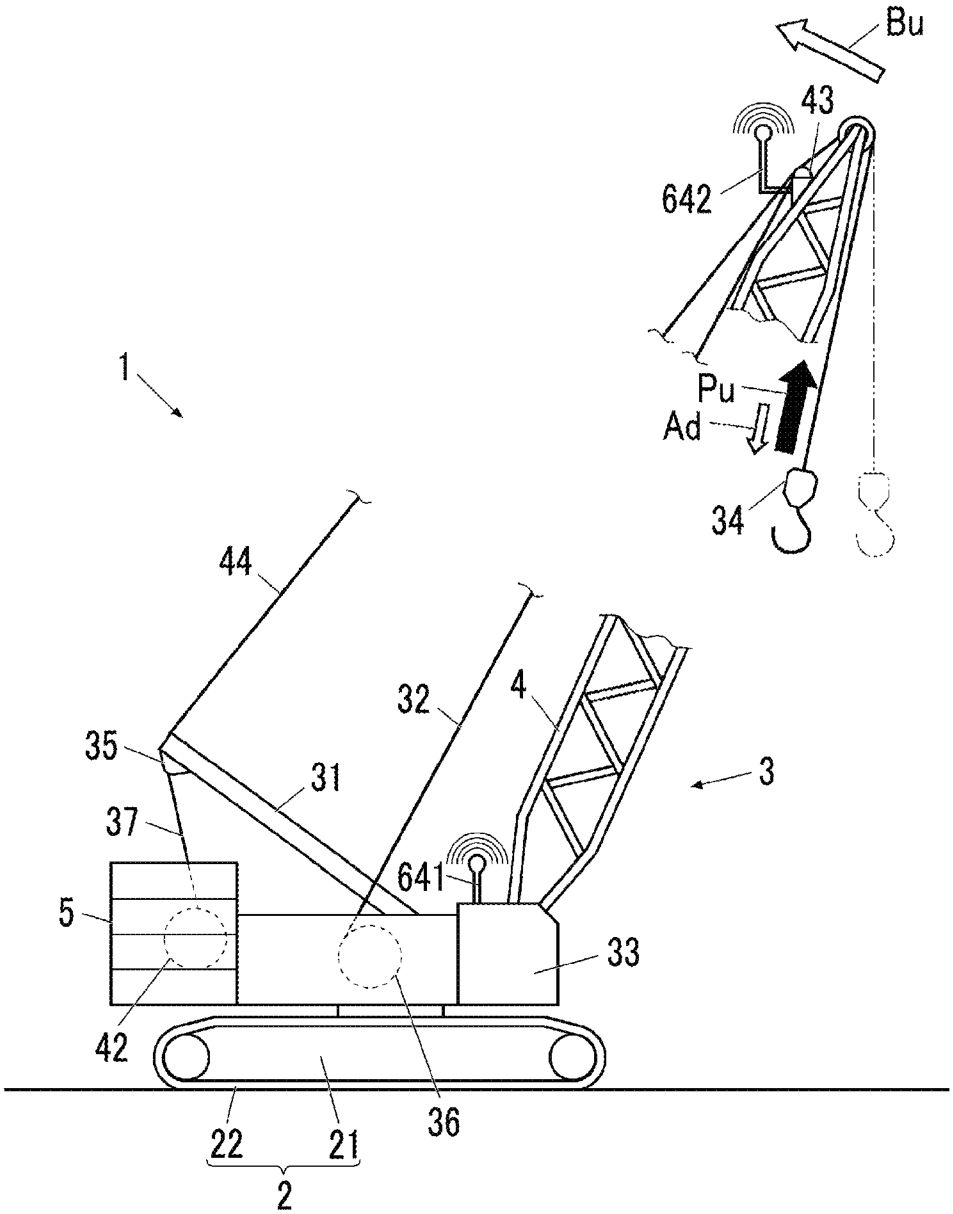
FIG. 6 is a diagram illustrating a state where the position of the hook relative to the position of the boom in a plan view is changed toward a rotating platform.
Figure 7:
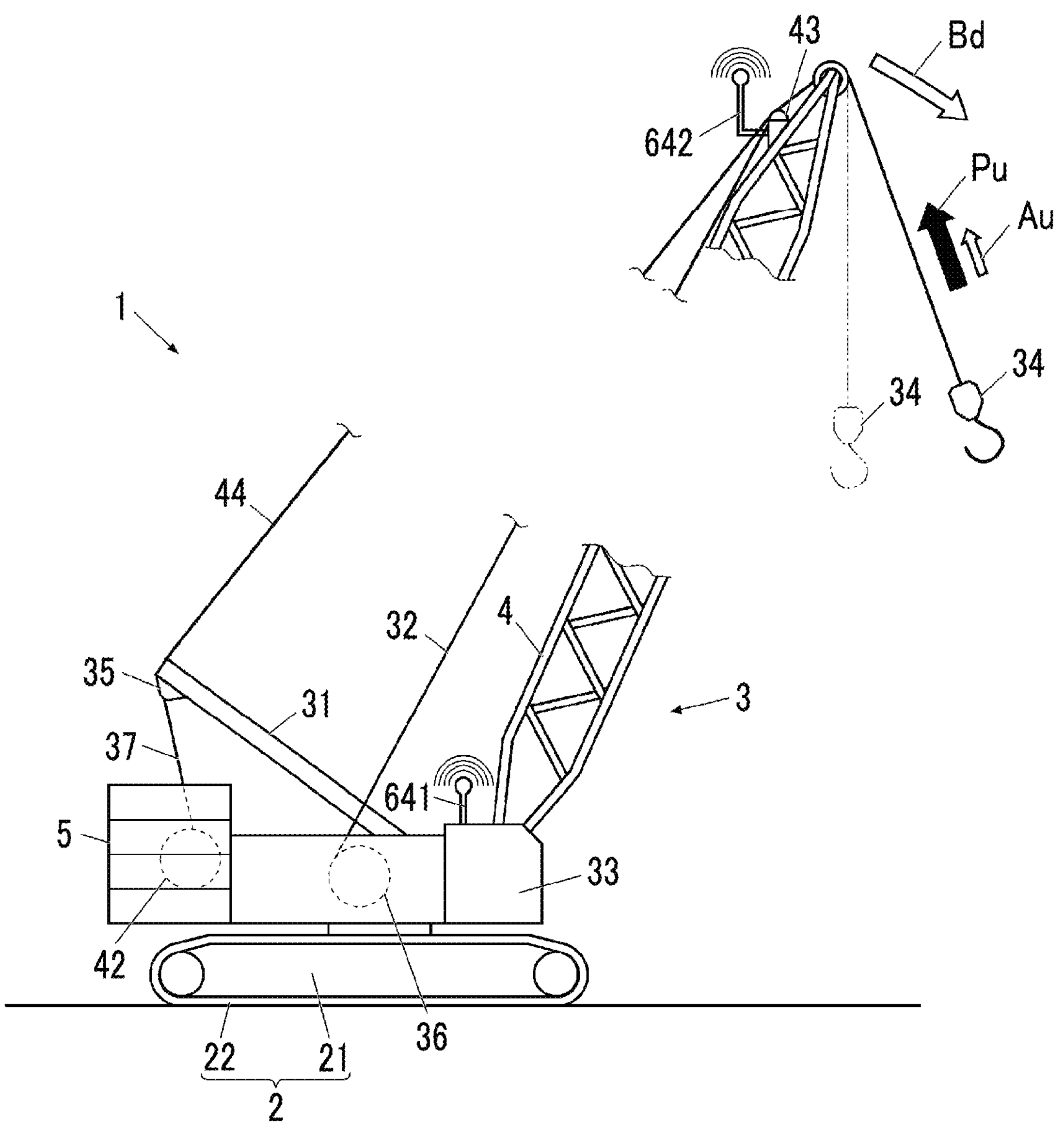
FIG. 7 is a diagram illustrating a state where the position of the hook relative to the position of the boom in a plan view is changed to a side opposite to the rotating platform (a side opposite to a crane body).

FIG. 4 is a flowchart of the position adjustment control, FIG. 5 is a diagram illustrating a state where the position of the hook 34 relative to the position of the boom 4 in a plan view is not changed in the hoisting motion of the suspended load L, FIG. 6 is a diagram illustrating a state where the position of the hook 34 relative to the position of the boom 4 in a plan view is changed toward the rotating platform 3, and FIG. 7 is a diagram illustrating a state where the position of the hook 34 relative to the position of the boom 4 in a plan view is changed to a side opposite to the rotating platform 3 (a side opposite to the crane body). The suspended load L is not shown in FIGS. 5 to 7.

The position adjustment control is motion control for reducing a change in the position of the hook 34 in a case where the position of the hook 34 relative to the position of the boom 4 in a plan view is changed until at least the suspended load L is separated from the ground surface from the start of the hoisting motion of the suspended load L.

As shown in FIG. 4, when the suspended load L is to be hoisted, the hoisting winch 36 is driven and hoisting is started (Step S3) in a case where the hook 34 and the suspended load L are connected to each other and, for example, the execution of a hoisting motion is input from the input unit 621 (Step S1).

Before the start of the drive of the hoisting winch 36, a worker may adjust a position in advance by the operation lever 624 so that the tip of the boom 4 is positioned immediately above the hook 34 connected to the suspended load L.

In a case where the hoisting motion is started, the position adjustment control unit 611 acquires the coordinates of the positions of the cab 33 of the rotating platform 3, the tip of the boom 4, and the hook 34 from the positioning data of the respective positioning units 641 to 643 (Step S5).

The position adjustment control unit 611 expands a crane coordinate system on the horizontal plane of the rotating platform 3 of the crane 1 and calculates the coordinates of the positions of the respective positioning units 641 to 643 projected onto the crane coordinate system.

Here, the crane coordinate system is a Cartesian coordinate system that is expanded on a horizontal plane formed by a front-rear direction axis parallel to the longitudinal direction of the boom 4 in a plan view and a left-right direction axis perpendicular to the front-rear direction axis as shown in FIG. 2.

The position adjustment control unit 611 calculates the boom tip position and the hook position in the crane coordinate system from the coordinates of the positions of the respective positioning units 641 to 643. Then, the position adjustment control unit 611 calculates the amount of shift between the boom tip position and the hook position (Step S7).

In addition, the position adjustment control unit 611 determines whether or not a shift between the boom tip position and the hook position occurs on the basis of the calculation (Step S9). In this case, it is preferable that a threshold value is set for the amount of shift between the boom tip position and the hook position in advance. Accordingly, the position adjustment control unit 611 determines that the boom tip position and the hook position coincide with each other in a case where the calculated amount of shift is smaller than the threshold value, and determines that a shift occurs between the boom tip position and the hook position in a case where the calculated amount of shift is equal to or larger than the threshold value.

Then, in a case where the position adjustment control unit 611 determines that a shift occurs between the boom tip position and the hook position (YES in Step S9), the position adjustment control unit 611 performs at least one of the upward/downward derricking motion of the boom 4 and the turning motion of the rotating platform so that the boom tip position and the hook position are close to each other (Step S11). At that time, a hoisting speed may be adjusted.

Then, the position adjustment control unit 611 causes processing to proceed to Step S13.

Further, in a case where the position adjustment control unit 611 determines that a shift does not occur between the boom tip position and the hook position (NO in Step S9), the position adjustment control unit 611 skips Step S11 and causes processing to proceed to Step S13.

Then, the position adjustment control unit 611 determines in Step S13 whether or not the suspended load L is in a lift-off state. Lift-off means a state where all portions of the suspended load L are away from the ground surface (ground) due to hoisting to some extent.

The position adjustment control unit 611 may determine that the suspended load L is in the lift-off state from the passage of specified time from the start of hoisting, or may determine that the suspended load L is in the lift-off state in a case where a hoisting distance reaches a specified hoisting distance from the start of hoisting.

Further, in a case where the position adjustment control unit 611 determines that the suspended load L is not in the lift-off state, the position adjustment control unit 611 returns the processing to Step S5, acquires the coordinates of the current positions of the cab 33 of the rotating platform 3, the tip of the boom 4, and the hook 34, and repeats the processing of the subsequent Steps S5 to S13.

Further, in a case where the position adjustment control unit 611 determines that the suspended load L is in the lift-off state, the position adjustment control unit 611 ends the position adjustment control.

Strictly speaking, the position adjustment control unit 611 may not end the position adjustment control in the lift-off state, and may end the position adjustment control at least after the lift-off state.

Further, in Step S13, the position adjustment control unit 611 ends the position adjustment control but continues the hoisting motion of the suspended load L.

A plurality of modes of a shift between the boom tip position and the hook position in Step S9 of the position adjustment control, and the upward/downward derricking motion of the boom 4, the turning motion of the rotating platform 3, and the motion control for adjusting a hoisting speed, which are executed for each mode, will be described in more detail.

As shown in FIG. 5, in a state where the hook 34 is positioned immediately below the tip of the boom 4, that is, an ideal state where the boom tip position and the hook position coincide with each other, the position adjustment control unit 611 executes the hoisting motion of the suspended load L while maintaining a specified hoisting speed Pu set in advance without changing the derricking angle of the boom 4 and the turning angle of the rotating platform 3.

Meanwhile, there are a case where the hook position is shifted rearward relative to the boom tip position in a plan view (FIG. 6), a case where the hook position is shifted forward relative to the boom tip position in a plan view (FIG. 7), and a case where the hook position is shifted leftward or rightward relative to the boom tip position in a plan view (the hook 34 shown by a two-dot chain line of FIG. 2).

Figure 8:
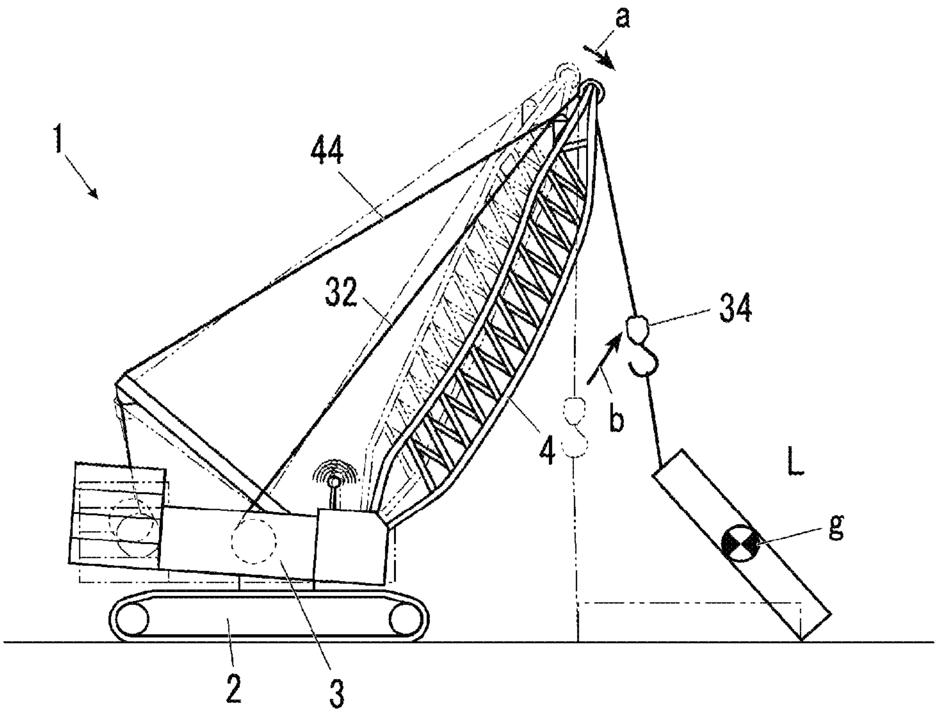
FIG. 8 is a side view of the crane that shows a cause of the positional shift of a hook position relative to a boom tip position in a plan view.

The forward tilt of the rotating platform 3 and the like of the crane 1 as shown by an arrow a of FIG. 8 or the bending of the boom 4, which is caused by the weight of the suspended load L, can be considered as one of the causes thereof. In this case, the hook position is shifted rearward relative to the boom tip position in a plan view.

Further, a fact that the relative position of the hook 34 in a plan view is shifted from the center g of gravity of the suspended load L at the start time of a hoisting motion as shown by an arrow b of FIG. 8 can be considered as another cause. In that case, the suspended load L is inclined due to hoisting. Accordingly, the hook 34 is also pulled by the suspended load L and is moved, so that a shift occurs. In the case of this cause, the direction of a shift after the start of hoisting is determined by the direction of the initial shift of the hook position from the center g of gravity of the suspended load L. For this reason, a shift may occur in any direction on a horizontal plane.

In a case where the hook position is shifted rearward relative to the boom tip position in a plan view as shown in FIG. 6, the position adjustment control unit 611 drives the derricking winch 42 to cause the boom 4 to perform an upward derricking motion in the direction of an arrow Bu. Accordingly, since the boom tip position is moved rearward, the amount of shift between the boom tip position and the hook position is reduced or removed.

In this case, since the hook 34 is lifted up due to the upward derricking of the boom 4, the position adjustment control unit 611 performs the motion control of the hoisting winch 36 so that the hoisting motion of the suspended load L is not suddenly accelerated and a specified hoisting speed Pu is adjusted to be reduced by an adjustment speed Ad in a direction opposite to hoisting.

The magnitude of the adjustment speed Ad may be determined according to the amount of shift between the boom tip position and the hook position occurring relatively in the front-rear direction in a plan view.

For example, table data showing a correspondence relationship between the amount of shift between the boom tip position and the hook position and the adjustment speed Ad are prepared, and the adjustment speed Ad may be determined with reference to the table data.

Further, a correlation between the amount of shift between the boom tip position and the hook position and the adjustment speed Ad may be expressed by an equation and the adjustment speed Ad may be calculated from the amount of shift.

In these cases, the absolute value of the adjustment speed Ad in a direction opposite to hoisting may be larger than the absolute value of the specified hoisting speed Pu. In this case, the hoisting winch 36 is driven not in a hoisting direction but in a lowering direction.

In a case where the hook position is shifted forward relative to the boom tip position in a plan view as shown in FIG. 7, the position adjustment control unit 611 drives the derricking winch 42 to cause the boom 4 to perform a downward derricking motion in the direction of an arrow Bd. Accordingly, since the boom tip position is moved forward, the amount of shift between the boom tip position and the hook position is reduced or removed.

In this case, since the hook 34 is lowered due to the downward derricking of the boom 4, the position adjustment control unit 611 performs the motion control of the hoisting winch 36 so that the hoisting speed of the suspended load L is not reduced or the suspended load L does not collide with the ground and a specified hoisting speed Pu is adjusted to be increased by an adjustment speed Au in the hoisting direction.

The magnitude of the adjustment speed Au may also be determined according to the amount of shift between the boom tip position and the hook position occurring relatively in the front-rear direction in a plan view.

In that case, the adjustment speed Au may be determined using table data showing a correspondence relationship between the amount of shift between the boom tip position and the hook position and the adjustment speed Au, or a correlation between the amount of shift between the boom tip position and the hook position and the adjustment speed Au may be expressed by an equation and the adjustment speed Ad may be calculated.

In a case where the hook position is shifted leftward or rightward relative to the boom tip position in a plan view as shown in FIG. 2, the position adjustment control unit 611 drives the turning hydraulic motor to perform a motion for causing the rotating platform 3 and the boom 4 to turn leftward or rightward. It is preferable that a turning angle in this case is equal to an angle for canceling the amount of leftward or rightward shift.

Accordingly, the amount of shift between the boom tip position and the hook position is reduced or removed.

Further, the shift of the hook position relative to the boom tip position in a plan view may simultaneously occur in the front-rear direction and the left-right direction.

In that case, the adjustment of a position in the front-rear direction shown in FIG. 6 or 7 and the adjustment of a position in the left-right direction shown in FIG. 2 may be performed in parallel.

Technical Effects of Embodiment of Present Invention

As described above, the controller 61 of the control device 60 of the crane 1 includes the position adjustment control unit 611 that performs position adjustment control for causing the hook position and the boom tip position to be close to each other as viewed in the vertical direction until the suspended load L is separated from the ground surface from the start of a hoisting motion.

For this reason, it is possible to effectively reduce a positional shift between the boom tip position and the hook position that occurs after the start of the hoisting of the suspended load L in the crane 1. Accordingly, it is possible to effectively suppress the occurrence of the oscillation of the suspended load L after lift-off.

Further, since the position adjustment control unit 611 detects the movement direction of the hook 34 relative to the rotating platform 3 and performs position adjustment control, it is possible to more appropriately reduce a positional shift between the boom tip position and the hook position.

Furthermore, the position adjustment control unit 611 performs any one of the upward and downward derricking motions of the boom 4 and the adjustment of the speed of the hoisting motion of the hook 34 according to the movement direction of the hook 34 relative to the crane body in the position adjustment control.

For this reason, it is possible to effectively reduce a positional shift between the boom tip position and the hook position after the start of hoisting by the derricking motion of the boom 4 and to suppress a change in a hoisting speed occurring due to the derricking motion of the boom 4.

In particular, in a case where the hook 34 is relatively moved toward the rotating platform 3 (rear side), the position adjustment control unit 611 performs speed adjustment for reducing the hoisting speed of the hoisting motion of the hook 34 (including a case where the hoisting speed is reduced to 0) or for switching the hoisting motion to the lowering motion of the hook 34 together with the upward derricking motion of the boom 4 in the position adjustment control. Accordingly, a positional shift between the boom tip position and the hook position after the start of hoisting is effectively reduced by the derricking motion of the boom 4. Further, since the sudden hoisting of the suspended load L caused by the upward derricking motion of the boom 4 is avoided, a hoisting motion can be stably performed.

Furthermore, in a case where the hook 34 is relatively moved toward a side opposite to the rotating platform (front side), the position adjustment control unit 611 performs speed adjustment for increasing the hoisting speed of the hoisting motion of the hook 34 together with the downward derricking motion of the boom 4 in the position adjustment control. Accordingly, a positional shift between the boom tip position and the hook position after the start of hoisting is effectively reduced by the derricking motion of the boom 4. Further, since the sudden slowdown of the suspended load L caused by the downward derricking motion of the boom 4 is avoided, a hoisting motion can be stably performed.

Furthermore, in a case where the hook 34 is relatively moved from the boom 4 to any one of the left and right sides, the position adjustment control unit 611 performs the turning motion of the rotating platform 3 in a direction where the hook 34 is moved in the position adjustment control. For this reason, it is also possible to effectively reduce a positional shift in the left-right direction between the boom tip position and the hook position after the start of hoisting.

Further, since the turning motion of the rotating platform 3 is performed in parallel with the above-mentioned upward/downward derricking of the boom 4, it is possible to cope with a relative positional shift in all directions between the boom tip position and the hook position after the start of hoisting.

Others

Details described in the embodiment of the present invention can be appropriately changed without departing from the scope of the present invention.

For example, a case where the respective motions, such as the upward/downward derricking of the boom 4, the turning motion of the rotating platform 3, and the hoisting/lowering of the hook 34 after the start of the hoisting of the suspended load L, are performed by the motion control of the position adjustment control unit 611 regardless of the worker's operation has been exemplified in the above-mentioned position adjustment control.

In contrast, the respective motions may be performed by the worker's operation. In that case, it is preferable that the position adjustment control unit 611 instructs a worker to perform the operations by, for example, the display unit 622 or the like.

FIG. 9 shows a display example of a state display screen G of the crane 1 displayed on the display unit 622.

For example, in a case where a positional shift in a horizontal direction between the boom tip position and the hook position occurs until the suspended load L is separated from the ground surface from the start of a hoisting motion, the position adjustment control unit 611 displays instruction messages m1 and m2, which instruct a worker to operate, on the state display screen G. A case where the instruction message m1 instructing a worker to perform the upward derricking of the boom 4 and the instruction message m2 instructing a worker to adjust a specified hoisting speed in a direction opposite to hoisting are displayed in a case where the rearward positional shift of the hook position relative to the boom tip position occurs as shown in FIG. 6 described above is exemplified in the example shown in FIG. 9.

In addition to the above-mentioned example, in a case where the forward positional shift of the hook position relative to the boom tip position occurs as shown in FIG. 7 and a case where the leftward or rightward positional shift of the hook position relative to the boom tip position occurs as shown in FIG. 2, an instruction message instructing a worker to perform a motion corresponding to each case is displayed.

Further, any means, which can be perceived by a worker, such as the lighting of a lamp indicating the contents of the instruction or a voice message generated by a voice output unit, may be used for an instruction to instruct a worker to operate without being limited to the display unit 622.

Furthermore, the controller 61 instructs the upward/downward derricking of the boom 4, but the adjustment of a hoisting speed may be optimized by the control of the controller 61.

Further, the position adjustment control of the embodiment can be applied to all cranes that hoist suspended loads, and can be applied to various cranes, such as an overhead traveling crane, a jib crane, a truck crane, a crab crane, and a wheel crane. That is, the position adjustment control of the embodiment can also be applied to a crane that includes a beam for supporting a hook as a boom of which the derricking is not performed.

Further, position adjustment control, which uses the extension/contraction motion of a boom as in a telescopic crane without being limited to the rotation of the boom, may be performed as the position adjustment control for causing the position of the hook and the position of the tip of the boom to be close to each other.

It should be understood that the invention is not limited to the above-described embodiment, but may be modified into various forms on the basis of the spirit of the invention. Additionally, the modifications are included in the scope of the invention.

What is claimed is:

1. A crane comprising:

a boom; and a controller comprising a position adjustment controller, wherein the crane hoists a suspended load through a hook from a tip of the boom, and the position adjustment controller is configured to determine a distance between a position of the hook and a position of the tip of the boom in a plan view is within a predetermined value; and instruct, when the distance is not within the predetermined value, the controller or an operator to control the crane to shorten the distance in the plan view until the suspended load is separated from a ground surface from a start of a hoisting motion of the hook.

2. The crane according to claim 1, further comprising:

a crane body to which the boom is attached such that the boom is capable of performing a derricking motion; and counterweights that make a weight balance with the boom and the suspended load.

3. The crane according to claim 2, wherein a cab is disposed on a front right side of the crane body, and a positioning unit is provided on each of the cab, the tip of the boom, and the hook.

4. The crane according to claim 3, wherein the positioning unit is formed of a GNSS receiver that detects positions of the cab, the tip of the boom, and the hook.

5. The crane according to claim 1, further comprising: a crane body to which the boom is attached such that the boom is capable of performing a derricking motion, wherein the position adjustment controller is configured to instruct the controller or the operator according to a relative movement direction of the hook with respect to the crane body until the suspended load is separated from the ground surface from the start of the hoisting motion of the hook.

6. The crane according to claim 5, wherein the position adjustment controller is configured to instruct the controller or the operator to perform any one of upward and downward derricking motions of the boom and adjustment of a speed of the hoisting motion of the hook according to the relative movement direction of the hook with respect to the crane body.

7. The crane according to claim 6, wherein the position adjustment controller is configured to, in a case where the distance between the position of the hook and the position of the tip of the boom is within the predetermined value, instruct the controller or the operator to execute the hoisting motion of the hook while maintaining a hoisting speed.

8. The crane according to claim 6, wherein the position adjustment controller is configured to, in a case where the hook moves toward the crane body in the plan view with respect to an initial position of the hook, instruct the controller or the operator to reduce a hoisting speed of the hoisting motion of the hook or to switch the hoisting motion to a lowering motion of the hook together with the upward derricking motion of the boom.

9. The crane according to claim 6, wherein the position adjustment controller is configured to, in a case where the hook moves toward a side opposite to the crane body in the plan view with respect to an initial position of the hook, instruct the controller or the operator to increase a hoisting speed of the hoisting motion of the hook together with the downward derricking motion of the boom.

10. The crane according to claim 1, wherein the position adjustment controller is configured to, in a case where the hook moves in a right and left direction, which is perpendicular to a front and rear direction in the plan view, with respect to an initial position of the hook, instruct the controller or the operator to turn a crane body in a direction where the hook moves.

11. The crane according to claim 1, further comprising: a crane body to which the boom is attached such that the boom is capable of performing a derricking motion, wherein the position adjustment controller is configured to display an instruction message for instructing the operator to perform the operation on a state display screen of the crane according to a relative movement direction of the hook with respect to the crane body until the suspended load is separated from the ground surface from the start of the hoisting motion of the hook.

* * * * *